March 6, 1928.
G. O. SANBORN
1,662,044
METHOD OF PACKING BAKED FRUITS AND VEGETABLES
Filed March 9, 1927
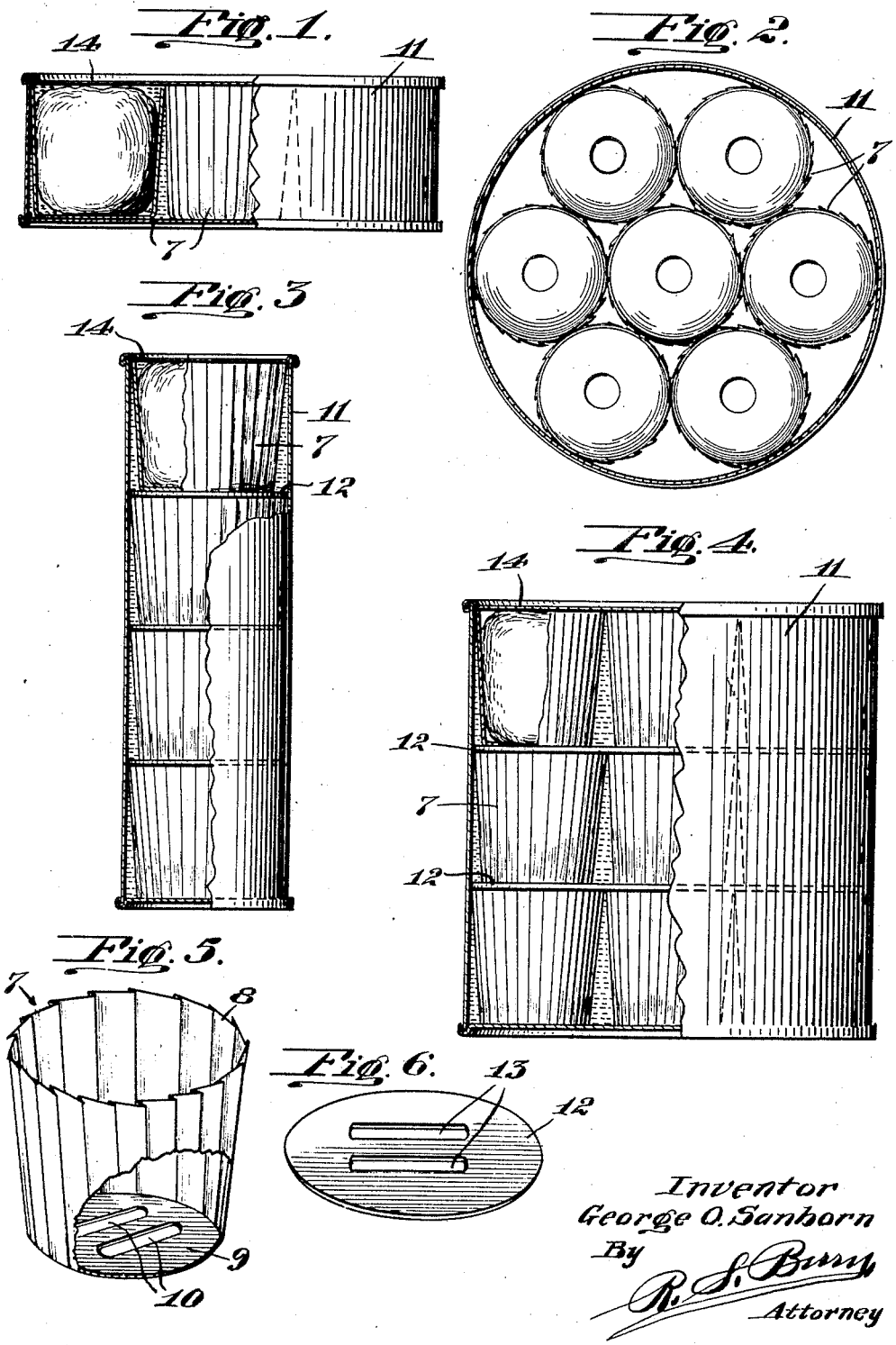
Inventor
George O. Sanborn
By
R. S. Berry
Attorney Patented Mar. 6, 1928.

1,662,044

UNITED STATES PATENT OFFICE.

GEORGE O. SANBORN, OF LOS ANGELES, CALIFORNIA.

METHOD OF PACKING BAKED FRUITS AND VEGETABLES.

Application filed March 9, 1927. Serial No. 173,822.

This invention relates to a means and method of packaging baked fruits and vegetables of comparatively large size, such as apples, pears, peppers, tomatoes, and the like, and more particularly pertains to a process of canning baked apples.

Prior to the present invention attempts have been made to can baked apples as a commercial product which have met with little or no success, and attempts to market baked apples in cans containing a plurality of the fruit en masse have failed for the reason that the apples become mushed and converted into sauce and thereby lose their identity. This mushing of the baked apples is due to the soft character of the baked fruit which renders it susceptible to being readily disintegrated when packing in the can and on subjecting the cans containing same to the agitation incident to handling and transportation of the cans. The packaging of single baked apples in individual cans for marketing has been done heretofore in a small way, but has proven not commercially practical because of prohibitive cost.

The purpose of the present invention is to provide a means and method whereby a plurality of baked apples and similar products may be packed in a single container with the individual articles so separated from each other as to prevent their being disrupted, or mushed, or converted into a sauce, and whereby on removing the articles from the container they will practically retain their original shape or contour and be of pleasing appearance thus preserving their identity and retaining their essential characteristics and also enabling their being served individually.

Another object is to provide a means and method for canning a multiple of baked apples and the like in a single container whereby adjacent fruit will be prevented from adhering and the fruit confined against excessive distortion so as to facilitate separation of adjacent fruit in effecting its removal from the container without injury to its rotund form, or shape and whereby the possibility of rupturing or defacing the fruit is obviated.

A further object is to provide a means for confining and separating a series of individual baked products within a container so formed as to facilitate packing of the products within the container and also enable the rapid filling of the container with a syrup.

With the foregoing objects in view together with such other objects and advantages as may subsequently appear, my invention resides in providing individual receptacles or compartments for each baked article, so formed as to retain the article in substantially its normal rotundity, into which the articles are placed after baking thereof, and thereafter placing a plurality of such receptacles with their contents in a container which is then filled with syrup and sealed; and then subjecting the container and its contents to heat treatment as will be hereinafter more fully described and claimed.

The invention is illustrated by way of example in the accompanying drawing in which:

Fig. 1 is a view in section and elevation illustrating the manner of packing a plurality of baked apples in a can in which the apples are arranged in a single layer;

Fig. 2 is a plan view of the can with the top removed showing the manner of arranging a series of the baked articles in a layer;

Fig. 3 is a view in elevation partly in section showing the manner of packing a series of baked apples in a tier;

Fig. 4 is a view in section and elevation showing the manner of packing the baked apples in a series of superimposed layers;

Fig. 5 is a perspective view of the individual receptacle with portions broken away;

Fig. 6 is a perspective view of a partition which may be employed separately or in conjunction with the receptacle shown in Fig. 5.

In carrying the invention into effect as applied to baked apples, the apples preferably unpeeled and cored, but not necessarily so, are baked in an approved manner, being usually baked in a temperature of approximately 300° Fahrenheit for from thirty to forty minutes. This baking operation is such as not to effect disintegration of the fruit so that the latter will substantially retain its original shape and will have the character of baked apples as ordinarily produced. The baked apples are then placed in individual receptacles 7 that are of general cup shape in form, as shown in Fig. 5, and are preferably made of paper or other suitable fibrous material having such rigidity as to offer substantial resistance to crushing. This receptacle 7 has substantially cylindrical side walls 8, is open at the top, and has a bottom wall 9 formed with openings 10 which openings serve to permit the flow of syrup through the receptacle and around the baked apple contained therein or allow syrup to flow into the receptacle from the under side thereof during the process of packing them in cans. After thus placing the baked apple in the receptacle 7, a plurality of the receptacles with their baked content are then arranged within a can 11 or other suitable container adapted to be hermetically sealed. The container 11 may be of such height and diameter as to receive a single layer of the fruit as shown in Figs. 1 and 2 or may be of such size and shape as to receive a single tier of the fruit as shown in Fig. 3, or may be of such character as to receive a series of superimposed layers of the fruit as shown in Fig. 4.

Where the fruit containing receptacles 7 are arranged in tiers, the adjacent receptacles may be separated from each other by means of partitions 12 shown in Fig. 6, which partitions may be formed of paper or other suitable fibrous material and are provided with apertures 13 to permit the passage of syrup therethrough.

Where the fruit is to be packed in a single tier as shown in Fig. 3, the receptacles 7 might in some instances be dispensed with and the contiguous fruits separated by the partitions 12, and where the fruit is to be packed in superimposed layers as shown in Fig. 4, the partitions 12 may be of such size as to extend entirely over a layer of the receptacles 7 or a separate partition 12 may be arranged between each of the superimposed receptacles.

It is obvious that in some instances the use of the partitions 12 may be entirely dispensed with especially where the bottom walls 9 of the receptacles 7 will adequately serve to separate the superimposed fruit arranged in the receptacles.

The containers 11 and the receptacles 7 are of such relative diameters that the side walls of the container 11 will form a shaft for at least a portion of the side walls of the receptacles 7 arranged contiguous thereto, and where the receptacles are arranged in layers they are preferably packed in such close relation that the adjacent receptacles will tend to support each other.

After thus packing the receptacles and their fruit content in the container 11 a hot syrup, preferably boiling, is poured into the container to fill the voids between the receptacles and around the fruit, which is facilitated by the provision of the openings 10 in the bottom walls of the receptacles and the apertures 13 in the partitions 12. The container on thus being filled with syrup is then hermetically sealed by a cap 14 as is common in canning operations. The sealed container may then be subjected to a heat treatment such as to effect sterilization of its contents, being preferably subjected to a temperature of from 145° Fahrenheit and upwards for a period of about twenty-five minutes which may be effected in the ordinary steam cooker or by baking. This sterilizing operation is such as not to effect cooking of the contents of the container sufficiently to cause disintegration of the baked apples. The containers on them being allowed to cool will be in readiness for marketing.

In order to insure the apples remaining intact and whole, initial baking thereof is preferably such as to only partially bake the fruit and so that the hot syrup will not reduce the fruit to a sauce. The hot syrup and the sterilizing operation will complete the cooking of the baked article.

In some instances the submergence of the baked articles in syrup may be dispensed with, as for example, in packing the articles in vacuum, in which event the final cooking could be effected by subjecting the hermetically sealed containers to the necessary heat.

It will be understood that while I have herein specifically set forth my invention as applied to the packing of baked apples, it also comprehends packing of other baked fruits, such as pears, and is also applicable to packing of peppers, tomatoes and similar articles of comparatively large size.

From the foregoing it will be seen that I have provided a means and method for packing a plurality of baked apples and similar commodities in a single container in which each article will be confined and separated from adjacent articles so as to prevent its disintegration and commingling with its neighbor and retain it in substantially its original shape, thus making it possible to serve the article individually on removing it from its encompassing receptacle.

I claim:

1. The method of canning baked apples and similar articles consisting in first subjecting the articles to a baking action, placing each baked article in an individual receptacle, packing a plurality of the receptacles in a container and hermetically sealing the container.

2. The method of packaging baked apples and similar articles consisting in first subjecting the article to a baking action, placing each baked article in an individual receptacle, packing a plurality of the receptacles and their baked content in a container, substantially filling the container with hot syrup to submerge the receptacles and their baked content therein and then hermetically sealing the container.

3. The method of packaging baked apples and similar articles consisting in partially baking the articles, thereafter placing same in individual open receptacles, packing a plurality of the receptacles with their baked content in a container, filling the container with a hot syrup, and hermetically sealing the container with the syrup, receptacles, and baked articles therein.

4. The method of packaging apples and similar articles consisting in first subjecting the articles to a baking action at a temperature of about 300° Fahrenheit for approximately from thirty to forty minutes, placing the baked articles in individual open receptacles, packing a series of the receptacles and their contents in a container, filling the container with syrup, and hermetically sealing the container with the syrup and baked articles therein.

5. The method of canning apples and similar articles consisting in first subjecting the articles to a baking action, and packing a plurality of the baked articles in a container with each article independently confined and separated from adjacent articles, and hermetically sealing the container.

6. The method of canning apples and similar articles consisting in first subjecting the articles to a baking action and then hermetically sealing a plurality of the articles submerged in syrup within a container, with each article independently confined and separated from its neighbor.

In testimony whereof, I have affixed my signature.

GEORGE O. SANBORN.